United States Patent [19]

Honda et al.

[11] Patent Number: 5,688,560
[45] Date of Patent: Nov. 18, 1997

[54] PROCESS FOR COATING METAL SURFACES

[75] Inventors: Takumi Honda, Hiratsuka; Kazuhisa Naito, Chigasaki; Mutsumi Hirota, Yokohama, all of Japan

[73] Assignee: Henkel Corporation, Plymouth Meeting, Pa.

[21] Appl. No.: 640,956

[22] PCT Filed: Nov. 1, 1994

[86] PCT No.: PCT/US94/12221

§ 371 Date: May 9, 1996

§ 102(e) Date: May 9, 1996

[87] PCT Pub. No.: WO95/13145

PCT Pub. Date: May 18, 1995

[30] Foreign Application Priority Data

Nov. 9, 1993 [JP] Japan ................... 5-303389

[51] Int. Cl.$^6$ ................ B05D 3/10; B05D 3/00
[52] U.S. Cl. ............ 427/341; 427/354; 427/388.4
[58] Field of Search ............. 427/354, 343, 427/443.2, 435, 341, 406, 344, 419.1, 436, 409, 419.5, 388.4

[56] References Cited

U.S. PATENT DOCUMENTS

| | | | |
|---|---|---|---|
| 3,647,567 | 3/1972 | Schweri | 148/6.15 |
| 3,795,546 | 3/1974 | Hall et al. | 148/6.2 |
| 3,819,423 | 6/1974 | Charles et al. | 148/251 |
| 3,829,371 | 8/1974 | Miki et al. | 204/181 |
| 3,945,899 | 3/1976 | Nikaido et al. | 148/251 |
| 4,030,945 | 6/1977 | Hall et al. | 148/6.2 |
| 4,103,049 | 7/1978 | Nishida et al. | 427/341 |
| 4,199,624 | 4/1980 | Smith | 427/241 |
| 4,411,937 | 10/1983 | Nishida | 427/435 |
| 4,462,842 | 7/1984 | Uchiyama et al. | 148/256 |
| 4,578,419 | 3/1986 | Hall | 514/401 |
| 4,637,839 | 1/1987 | Hall | 427/435 |
| 4,647,480 | 3/1987 | Ahmed | 427/435 |
| 4,657,788 | 4/1987 | Benton | 427/435 |
| 4,874,673 | 10/1989 | Donovan et al. | 428/463 |
| 5,164,234 | 11/1992 | Siebert | 427/435 |
| 5,342,694 | 8/1994 | Admed et al. | 427/443.1 |

OTHER PUBLICATIONS

Abstract of Japanese patent document J72017630–B, 1972 (no month) 1972.
Abstract of Japanese Patent document J73014412–B(no month) 1973.
Abstract of Japanese Patent J77021006–B Jun. 1977.
Abstract of Japanese Patent J77035692–B Sep. 1977.
Abstract of Japanese Patent J78015093–B May 1978.
Abstract of Japanese Patent J78016010–B May 1978.
Abstract of Japanese Patent J78044949–B Dec. 1978.
Abstract of Japanese Patent J79013453–B May 1979.
Abstract of Japanese Patent JP 60058474–A Apr. 1985.
Abstract of Japanese Patent JP 61168673–A Jul. 1986.
Abstract of Japanese Patent J 61246267–A Nov. 1986.
Abstract of Japanese Patent J 52056142–A May 1977.
Abstract of Japanese Patent J 52068240–A Jun. 1977.

*Primary Examiner*—Diana Dudash
*Attorney, Agent, or Firm*—Wayne C. Jaeschke; Norvell E. Wisdom, Jr.; Beatrice N. Robbins

[57] ABSTRACT

A process for coating metal surfaces in which an uncured resin coating is formed on the surface of a metal by contacting the metal surface with an autodepositing coating composition that contains acid, oxidizing agent, and water-dispersible or water-soluble organic film-forming resin, and the uncured coating is thereafter dried, produces a strongly adherent, highly corrosion-resistant autodeposited coating when the uncured coating is brought, prior to its drying, into contact with an aqueous solution that has a pH adjusted to 7 to 11 and that contains at least one selection from the following inorganic acids and salts thereof: molybdic acid, tungstic acid, polyphosphoric acid, and polysilicic acid.

9 Claims, No Drawings

PROCESS FOR COATING METAL SURFACES

TECHNICAL FIELD

The invention relates to a process for coating metal surfaces. More specifically, the invention relates to a process that produces highly corrosion-resistant and strongly adherent resin coatings on metal surfaces. This process is applied to the uncured resin coatings that are formed on metal surfaces when the surface of a metal is brought into contact with an autodepositing coating composition that contains acid, oxidizing agent, and water-dispersible or water-soluble organic film-forming resin. The process consists of contacting an uncured resin coating of this type with an aqueous solution that has a pH adjusted to 7 to 11 and that contains at least 1 selection from the following inorganic acids and salts thereof: molybdic acid, tungstic acid, polyphosphoric acid, and polysilicic acid.

BACKGROUND ART

Autodepositing coating compositions as referred to in this invention are acidic coating compositions that contain an organic film-forming resin and that produce a resin coating on the surface of metal brought into contact with the composition. Compositions of this type are disclosed in Japanese Patent Publication Numbers Sho 47-17630 [17,630/1972], Sho 48-14412 [14,412/1973], Sho 52-21006 [21,006/1977], Sho 52-35692 [35,692/1977], Sho 53-15093 [15,093/1978], Sho 53-16010 [16,010/1978], Sho 53-44949 [44,949/1978], and Sho 54-13435 [13,435/1979] and in Japanese Patent Application Laid Open [Kokai or Unexamined] Numbers Sho 60-58474 [58,474/1985], Sho 61-168673 [168,673/1986], and Sho 61-246267 [246,267/1986].

A characteristic feature of these known coating compositions is that immersion of a clean metal surface in the coating composition produces a resin coating whose thickness or weight increases with increasing immersion time. In addition, part of the metal ion eluted from the metal surface by the chemical etching of the coating composition is taken into the coating; this makes possible the efficient formation of a resin coating on the metal surface without utilizing externally supplied electricity as is used in the electrodeposition of coatings.

The conventional coating compositions, however, do not themselves always exhibit a satisfactory adherence or corrosion resistance, and as a result various treatment processes have been examined for the purpose of improving the adherence and corrosion resistance of autodeposited coatings on metal surfaces. For example, Japanese Patent Application Laid Open Number Sho 52-56142 [56,142/1977] teaches the use of a rinse in autodepositing coating processes that consist of application of a waterborne coating composition to a metal substrate followed by baking. This rinse is applied to the uncured autodeposited film between the deposition step and baking step and consists of an aqueous solution or waterborne dispersion whose main component is at least one selection from the group comprising the silicofluorides, borofluorides, titanofluorides, aluminofluorides, and nitrites. The application of this process makes possible the production, without the use of rust-preventing pigments, of autodeposited films that have a good corrosion resistance.

Japanese Patent Application Laid Open Number Sho 52-68240 [68,240/1977] teaches a rinse that, as in Japanese Patent Application Laid Open Number Sho 52-56142, is applied to the uncured autodeposited coating between the deposition step and the baking step. In this case, however, the rinse consists of an aqueous solution or waterborne dispersion whose main component is at least one selection from the group comprising amines, the amine salts of carboxylic acids, amino salts, melamine, and amides. The practice of this process is again reported to make possible the production of good corrosion-resistant autodeposited films without the use of rust-preventing pigments. Japanese Patent Application Laid Open Number Sho 60-58474 teaches a process that improves the water resistance of the coatings. In this process, an aqueous alkali metal or ammonium hydroxide solution is applied to the uncured autodeposited film on the metal surface prior to drying. This makes the dried film impermeable to water and thereby improves the water resistance.

U.S. Pat. Nos. 3,647,567 and 4,030,945 and Japanese Patent Application Laid Open Number Sho 61-168673 teach the preparation of good corrosion-resistant autodeposited films by a pre-drying rinse of the uncured autodeposited film on the metal surface with a chromium compound-containing aqueous solution.

In recent years, higher added value has been sought from the painting of metal surfaces, and in particular a higher corrosion resistance and higher adherence are desired. The art described hereinbefore, however, is not at a level that can consistently satisfy the required performance.

DISCLOSURE OF THE INVENTION

Problems to Be Solved by the Invention

The invention takes as its object the introduction of a process for coating metal surfaces that is able to coat metal surfaces with an autodeposited coating that has an adherence and corrosion resistance superior to those of the autodeposited coatings afforded by the prior art.

SUMMARY OF THE INVENTION

An autodeposited coating with an adherence and corrosion resistance far superior to the corresponding values provided by the prior art can be produced by the application before drying of a specific type of aqueous solution to the uncured resin coating formed on metal surfaces by contact with an autodepositing coating composition.

In specific terms, in the metal surface coating process in which an uncured resin coating is formed on the surface of a metal by contacting the metal surface with an autodepositing coating composition that contains acid, oxidizing agent, and water-dispersible or water-soluble organic film-forming resin, and the uncured coating is thereafter dried, the invention provides a process which is characterized in that said uncured coating is brought, prior to its drying, into contact with an aqueous solution that has a pH adjusted to 7 to 11 and that contains at least one selection from the following inorganic acids and salts thereof: molybdic acid, tungstic acid, polyphosphoric acid, and polysilicic acid.

Suitable metal substrates for the invention are specifically exemplified by ferriferous metals, zinciferous metals, aluminiferous metals, and the like.

The known autodepositing coating compositions are highly suitable for use as the autodepositing coating composition employed in the present invention. Some examples thereof are the coating compositions disclosed in Japanese Patent Publication Number Sho 54-13453 [13,453/1979], one of which consists of approximately 5 to 550 g/L as solids of a dispersed resin, approximately 0.4 to 5.0 g/L of hydrofluoric acid as acid component, approximately 0.3 to 3.0 g/L of hydrogen peroxide as oxidizing agent, and, optionally, water-dispersible pigment. Other examples are the coating compositions disclosed in Japanese Patent Publication Number Sho 52-35692, one of which consists of approximately 5 to 550 g/L as solids of a dispersed resin, approximately 0.4 to 5.0 g/L of hydrofluoric acid as acid component, no more than approximately 3.0 g/L of hydrogen peroxide as oxidizing agent, approximately 1 to 50 g/L of ferric fluoride as a metal compound component and co-oxidizing agent, and, optionally, water-dispersible pigment.

The inorganic acids used by the present invention are molybdic acid, tungstic acid, polyphosphoric acid, and polysilicic acid. The salts usable by the invention include the sodium salts, ammonium salts, calcium salts, potassium salts, and the like. The invention uses at least one selection from these inorganic acids and salts thereof.

DESCRIPTION OF PREFERRED EMBODIMENTS

The preferred content of the total of the inorganic acid(s) characteristic of the invention and salt(s) thereof in an aqueous solution used for treatment according to the invention preferably is, with increasing preference in the order given, at least 0.01, 0.05, 0.10, 0.30, 0.50, 0.70, 0.80, 0.90, or 1.0 grams per liter (hereinafter usually abbreviated as "g/L") and independently preferably is, with increasing preference in the order given, not more than 50, 40, 30, 20, 15, 13, 11, 9.0, 8.5, 8.0, 7.5, 7.0, 6.8, or 6.6 g/L. The effect from addition is usually insignificant at concentrations below 0.01 g/L, while additions in excess of 50 g/L are undesirable from a quality standpoint because such additions degrade the appearance of the coating and also its adherence and corrosion resistance.

The pH of the aqueous solution used by the invention is preferably adjusted before use into and maintained during use at a value that is, with increasing preference in the order given, not less than 7.00, 7.05, 7.10, 7.15, or 7.18 and independently preferably is, with increasing preference in the order given, not more than 11, 10.7, 10.4, 10.2, 10.1, 10.0, 9.9, or 9.8. An improved adherence and corrosion resistance can not normally be expected when the pH is substantially outside this range. Alkaline materials, for example, can be used to adjust the pH into this preferred range. While no narrow restrictions apply to alkaline materials usable in the present invention, ammonium bicarbonate and ammonium hydroxide are preferred. In addition to bases, inorganic acids, organic acids, and their salts may also be used to adjust the pH of the aqueous solution; for example, hydrofluoric acid, nitric acid, sulfuric acid, phosphonic acid, phosphinic acid, citric acid, oxalic acid, tartaric acid, and the like may be used for pH adjustment. The aqueous solution may contain an oxidizing agent, such as hydrogen peroxide and the like, as an optional component.

The wet uncured coatings are preferably rinsed with plain water before being treated according to the invention, but should not be allowed to dry before being contacted with the characteristic aqueous treatment solutions of this invention. After such contact with the aqueous treatment solutions according to this invention, the coating preferably is not rinsed before being dried.

The method for applying the aqueous solution to the uncured autodeposited coating is not critical to the invention, but immersion is preferred. The application temperature of the aqueous solution is also not critical, although for convenience, a normal ambient human comfort temperature of 20°±5° C. The contact time preferably is, with increasing preference in the order given, at least 0.08, 0.16, 0.30, 0.50, 0.60, 0.70, 0.80, 0.90, or 0.95 minutes (hereinafter usually abbreviated "min") and independently preferably is, with increasing preference in the order given, not more than 10, 7, 5, 4, 3, 2, 1.8, 1.6, 1.4, 1.2, or 1.1 min. Drying conditions also are not critical to the invention, but preferably the maximum temperature during drying is, with increasing preference in the order given, at least 30°, 50°, 70°, 90°, 100°, or 105° C. and independently preferably is, with increasing preference in the order given, not more than 250°, 230°, 220°, 210°, 200°, 190°, 185°, or 181° C. for acrylate type organic resins and not more than 120°, 115°, 114°, 113°, 112°, 111°, or 110° C. for poly{vinylidene chloride} resins. Independently, the time at these temperatures preferably is, with increasing preference in the order given, at least 0.5, 1.0, 2.0, 4.0, 7.0, 10, 12, 14, 16, 18, or 19 min and independently preferably is, with increasing preference in the order given, not more than 60, 50, 40, 30, 28, 26, 24, 22, or 21 min.

The crux of the invention is that application of the subject aqueous solution to the uncured autodeposited coating is able to produce a strongly adherent, highly corrosion-resistant autodeposited coating, possibly due to the formation of a passivation coating on the metal surface. Such a passivation coating could be produced through the formation of complexes between anion supplied from the molybdic acid, tungstic acid, polyphosphoric acid, and/or polysilicic acid and/or salts thereof present in the aqueous solution and metal cations taken up by the autodeposited coating and particularly metal cations present on the metal surface by virtue of the uncured autodeposited film. Corrosion may also be inhibited through the formation of complexes between said anions that have been taken up by the coating and the metal cations eluting during metal corrosion.

The invention is illustrated in greater detail below through working and comparative examples. The test methods used to evaluate performance are also explained below.

EXAMPLES

Evaluation of coating adherence by the crosscut/ tape peel test

A crosshatch pattern of one hundred 1 millimeter ("mm") ×1 mm squares was cut in the test panel and peeled with adhesive tape, and the number of remaining coating film squares was counted. This test was conducted both before and after immersion in water at 40° C. for 240 hours.

Evaluation of coating adherence by the Du Pont impact test

A 1 kg impacter with a diameter of 1.27 centimeters ("cm") was dropped on the test panel and the impact zone was peeled with adhesive tape. The value measured was the highest impacter drop-height in cm at which film peeling did not occur. This test was conducted both before and after immersion in water at 40° C. for 240 hours.

Evaluation of coating adherence by the Erichsen test

The test surface of the test panel was extruded 5 mm using an Erichsen test instrument, and the cupped region was then peeled with adhesive tape. Film peeling was evaluated according to the scale given below:

+++: no film peeling
++: area of film peeling is less than 2%
+: area of film peeling is less than 10%
x: area of film peeling is at least 10%.

This test was conducted both before and after immersion in water at 40° C. for 240 hours.

Corrosion resistance test

A cross was scribed in the coating on the test panel to reach the base metal. The test panel was then subjected to salt spray testing (500 hours for cold-rolled steel, galvannealed hot-dip zinc-coated steel, and electrogalvanized steel; 1,000 hours for aluminum), and tape peeling was conducted after this exposure. The evaluation consisted of measurement of the peel width (one side, in mm) from the cross scribe line.

Examples 1 to 6

Preliminarily cleaned panels (70×150×1 mm) of cold-rolled steel, galvannealed hot-dip zinc-plated steel, electro-galvanized steel, and aluminum were immersed for 180 seconds in autodepositing coating composition A:

| Component | Concentration |
|---|---|
| Rhoplex ™ WL-91 acrylic resin latex, 41.5% solids (supplied by the Rohm and Haas Company) | 120.50 g/L |
| Hydrofluoric acid | 0.50 g/L |
| Hydrogen peroxide | 0.05 g/L |
| Ferric fluoride | 3.00 g/L |
| Deionized water | balance. |

This composition was maintained at a bath temperature of approximately 20° C. to 22° C. After a water rinse, the panels were immersed at ambient temperature for 60 seconds in aqueous treating solution A, B, C, D, or E, with compositions shown in Table 1 below. This was followed by oven drying for 20 minutes at 180° C. and then testing. The results of performance testing on the test panels are reported in Table 2.

TABLE 1

| Characteristic of the Aqueous Treating Solutions | Value of the Characteristic for Aqueous Treating Solution Composition Designated: | | | | | | | | | | | |
|---|---|---|---|---|---|---|---|---|---|---|---|---|
| | A | B | C | D | E | F | G | H | I | J | K | L |
| Molybdic acid, g/L | 5.00 | 5.00 | | | | | | | | | | |
| Calcium molybdate, g/L | | 1.50 | | | | | | | | | | |
| Ammonium Molybdate, g/L | | | | 5.00 | | | | 0.80 | 5.00 | | | |
| Tungstic acid, g/L | | | 0.15 | | | | | | | | | |
| Sodium tungstate, g/L | | | 5.00 | | | 1.00 | | | | | | |
| Polyphosphoric acid, g/L | | | | | 0.25 | | | | | | | |
| Sodium polyphosphate, g/L | | | | | 3.50 | | | | | | | |
| Sodium polysilicate, g/L | | | | | | | 3.00 | | | | | |
| Ammonium Hydroxide, g/L | 5.00 | 4.50 | 4.50 | | 6.50 | 5.50 | 5.50 | 6.50 | 2.00 | | 5.00 | 5.00 |
| Ammonium Bicarbonate, g/L | | | | 3.00 | | | | | | 3.00 | | |
| Nitric acid, g/L | | | | | | | | | 5.00 | | | |
| Phosphinic acid, g/L | | | | | | 0.20 | | | | | | |
| Sodium phosphonate, g/L | | | | | 0.65 | | | | | | | |
| Citric acid, g./L | | | | 0.80 | | | | | | | | |
| Ammonium Oxalate, g/L | | | | | | | | 0.50 | | | | |
| Hydrogen peroxide, g/L | 0.01 | | | | | | | 0.01 | | | | |
| pH | 8.5 | 9.8 | 8.5 | 7.2 | 7.5 | 8.0 | 8.5 | 9.0 | 6.0 | 7.5 | 10.5 | 12.0 |

TABLE 2

| | | | Type of Panel Coated: | | | | Coating Add-On, | Adherence Test Results: | | | | | | Corrosion Resistance |
|---|---|---|---|---|---|---|---|---|---|---|---|---|---|---|
| | | | | | | | | Crosscut/ Peel | | DuPont Impact | | Erichsen Test | | |
| Example Number | AC: | ATC: | CRS | GHD | EG | Aluminum | gm² | Pre-I | Post-I | Pre-I | Post-I | Pre-I | Post-I | |
| 1 | A | A | ✓ | | | | 22 | 100 | 100 | 40 | 30 | +++ | +++ | 1.0 |
| 2 | A | B | ✓ | | | | 24 | 100 | 100 | 40 | 40 | +++ | +++ | 1.0 |
| 3 | A | C | ✓ | | | | 23 | 100 | 100 | 40 | 40 | +++ | ++ | 1.5 |
| 4 | A | D | ✓ | | | | 22 | 100 | 100 | 40 | 30 | +++ | +++ | 1.0 |
| 5 | A | E | | ✓ | | | 21 | 100 | 100 | 40 | 40 | +++ | ++ | 1.5 |
| 6 | A | E | | | | ✓ | 20 | 100 | 100 | 50 | 40 | +++ | +++ | 0.5 |
| 7 | B | F | ✓ | | | | 18 | 100 | 100 | 50 | 40 | +++ | +++ | 1.5 |
| 8 | B | G | | ✓ | | | 17 | 100 | 100 | 40 | 40 | +++ | +++ | 1.0 |
| 9 | B | G | | | ✓ | | 20 | 100 | 100 | 30 | 30 | +++ | ++ | 1.5 |
| 10 | B | H | ✓ | | | | 18 | 100 | 100 | 40 | 30 | +++ | ++ | 1.5 |
| 11 | B | H | | | | ✓ | 19 | 100 | 100 | 50 | 40 | +++ | +++ | 0.5 |

TABLE 2-continued

| | | | Type of Panel Coated: | | | | Coating Add-On, | Adherence Test Results: | | | | | | Corrosion Resistance |
|---|---|---|---|---|---|---|---|---|---|---|---|---|---|---|
| | | | | | | | | Crosscut/ Peel | | DuPont Impact | | Erichsen Test | | |
| | AC: | ATC: | CRS | GHD | EG | Aluminum | gm² | Pre-I | Post-I | Pre-I | Post-I | Pre-I | Post-I | |

Comparative Example Number

| | AC: | ATC: | CRS | GHD | EG | Aluminum | gm² | Pre-I | Post-I | Pre-I | Post-I | Pre-I | Post-I | |
|---|---|---|---|---|---|---|---|---|---|---|---|---|---|---|
| 1 | A | I | ✓ | | | | 22 | 100 | 100 | 30 | 20 | + | x | 4.0 |
| 2 | A | J | | ✓ | | | 24 | 100 | 100 | 20 | 20 | + | x | 3.5 |
| 3 | A | K | | | ✓ | | 23 | 100 | 100 | 30 | 20 | + | x | 3.5 |
| 4 | A | L | ✓ | | | | 24 | 100 | 95 | 20 | 20 | + | x | 4.5 |
| 5 | A | M | ✓ | | | | 20 | 100 | 100 | 30 | 20 | + | x | 3.0 |
| 6 | B | J | | ✓ | | | 17 | 100 | 100 | 30 | 20 | + | + | 3.5 |
| 7 | B | K | | | | ✓ | 18 | 100 | 100 | 40 | 30 | ++ | + | 2.5 |
| 8 | B | L | ✓ | | | | 20 | 100 | 95 | 30 | 20 | + | x | 5.5 |

Notes for Table 2
"AC" means "Autodepositing Composition"; "ATC" means "Aqueous Treatment Composition"; "CRS" means "Cold-Rolled Steel"; "GHD" means "Galvannealed Hot-Dipped [Zinc-Coated Steel]"; "EG" means "Electrogalvanized [Steel]; "Pre-I" means "Pre-Immersion"; "Post-I" means "Post-Immersion".

Examples 7 to 11

Preliminarily cleaned panels (70×150×1 mm) of cold-rolled steel, galvannealed hot-dip zinc-coated steel, electrogalvanized steel, and aluminum were immersed for 180 seconds in autodepositing coating composition B:

Autodepositing coating composition B

| Component | Concentration |
|---|---|
| Daran™ SL-143 vinylidene chloride copolymer resin latex, 41.5% solids (supplied by W. R. Grace & Company) | 90.90 g/L |
| Hydrofluoric acid | 0.50 g/L |
| Hydrogen peroxide | 0.05 g/L |
| Ferric fluoride | 3.00 g/L |
| Deionized water | balance. |

This composition was maintained at a bath temperature of approximately 20° C. to 22° C. After a water rinse, the panels were immersed for 60 seconds in aqueous treating solution F, G, or H with compositions reported in Table 1 at ambient temperature. This was followed by oven drying for 20 minutes at 110° C. and then testing. The results of performance testing on the test panels are reported in Table 2.

Comparative Examples 1 to 4

Preliminarily cleaned panels (70×150×1 mm) of cold-rolled steel, galvannealed hot-dip zinc-coated steel, and electrogalvanized steel were immersed for 180 seconds in Autodepositing Coating Composition A as described for Examples 1 to 6. The composition was maintained at a bath temperature of approximately 20° to 22° C. After a water rinse, the panels were immersed for 60 seconds in an aqueous solution I, J, K, or L with compositions as shown in Table 1 at ambient temperature. This was followed by oven drying for 20 minutes at 180° C. and then testing. The results of performance testing on the test panels are reported in Table 2.

Comparative Example 5

Preliminarily cleaned panels (70×150×1 mm) of cold-rolled steel were immersed for 180 seconds in the autodepositing coating composition A described for Examples 1 to 6. The composition was maintained at a bath temperature of approximately 20° C. to 22° C. After a water rinse, the panels were immersed for 60 seconds at ambient temperature in chromium-containing aqueous solution containing 30 g/L of Palene® 60 concentrate, supplied by Nihon Parkerizing Company, Ltd. This was followed by oven drying for 20 minutes at 180° C. and then testing. The results of performance testing on the test panels are reported in Table 2.

Comparative Examples 6 to 8

Preliminarily cleaned panels (70×150×1 mm) of cold-rolled steel, galvannealed hot-dip zinc-plated steel, and aluminum were immersed for 180 seconds in the autodepositing coating composition B described for Examples 7 to 11. The composition was maintained at a bath temperature of approximately 20° to 22° C. After a water rinse, the panels were immersed for 60 seconds in aqueous solution J, K, or L, with compositions as reported in Table 1 at ambient temperature. This was followed by oven drying for 20 minutes at 110° C. and then testing. The results of performance testing on the test panels are reported in Table 2.

The conclusions set forth below can be drawn on the basis of Examples 1 to 11 and Comparative Examples 1 to 8.

1. In Examples 1 to 11, both autodepositing coating compositions A and B gave very good results for corrosion resistance and for film adherence as evaluated by the crosscut/tape peel test, Du Pont impact test, and Erichsen test.

2. In contrast to this, Comparative Examples 1,2, 3, and 4 gave poorer results for film adherence (as evaluated by the Du Pont impact test and Erichsen test) and corrosion resistance than were obtained in Examples 1 to 11. The pH 6.0 used in Comparative Example 1 was too low, while the pH 12.0 used in Comparative Example 4 was too high. Comparative Examples 2 and 3 used only base without the addition of an inorganic acid or salt thereof as specified for the invention. Comparative Example 4 also gave poorer results in the crosscut/tape peel test.

3. Comparative Example 5 used a chromium compound-containing aqueous solution from the prior art. While the film adherence as measured by the Du Pont impact test was only slightly poorer in Comparative Example 5 than in Examples 1 to 11, the film adherence as measured by the Erichsen test and the corrosion resistance were substantially poorer.

4. Comparative Examples 6 and 8 used autodepositing coating composition B in place of autodepositing coating composition A, but otherwise corresponded to Comparative Examples 2 and 4, respectively. The trends observed for Comparative Examples 6 and 8 were the same as for Comparative Examples 2 and 4, and the former thus exhibited a film adherence and corrosion resistance inferior to Examples 1 to 11.

5. Comparative Example 7 corresponded to Comparative Example 3, except that the former used autodepositing coating composition B in place of autodepositing coating composition A and used an aluminum panel as the coated panel in place of an electrogalvanized steel panel. Nevertheless, Comparative Example 7 still had a film adherence as measured by the Du Pont impact and Erichsen tests and a corrosion resistance inferior to those of Example 11.

BENEFITS OF THE INVENTION

The process for coating metal surfaces in accordance with the present invention forms an autodeposited coating whose adherence and corrosion resistance are superior to those of coatings produced by the heretofore known processes.

The invention claimed is:

1. A process for coating a metal surface, said process comprising steps of
   (A) contacting the metal surface with an autodepositing coating composition that comprises acid, oxidizing agent, and water-dispersible or water-soluble organic film-forming resin for a sufficient time to form on the metal surface a wet uncured coating comprising solids derived from the organic film-forming resin, said wet uncured coating being sufficiently adherent to the metal surface to remain in place when removed from contact with the autodepositing composition and rinsed with water;
   (B) removing the metal surface bearing the wet uncured coating formed in step (A) from contact with the autodepositing composition, and then contacting the wet uncured coating before it dries or is dried with an aqueous treatment solution that has an adjusted pH from 7 to 11 wherein prior to the adjustment of the pH said solution consists essentially of water and at least one component selected from the group consisting of the following inorganic acids and salts thereof, molybdic acid, tungstic acid, polyphosphoric acid, and polysilicic acid wherein the total concentration of materials selected from the group of molybdic acid, tungstic acid, polyphosphoric acid and polysilicic acid and the salts of these acids is from 0.1 to 50 g/L;
   (C) removing the metal surface bearing the wet uncured coating, after contacting it with the aqueous treatment solution, from contact with any aqueous liquid phase except for that which may be absorbed in the coating itself; and
   (D) drying the wet uncured coating from the end of step (C) to convert the wet uncured coating into a dry solid coating.

2. A process according to claim 1, wherein the time of contact in step (B) is from 0.08 to 10 min, and step (D) includes exposing the coating to a temperature of at least 70° C. for a time of at least 2 min.

3. A process according to claim 2, wherein the time of contact in step (B) is from 0.5 to 1.5 min, and step (D) includes exposing the coating to a temperature of at least 90° C. for a time of at least 5 min.

4. A composition according to claim 3, wherein, in the aqueous treatment solution used in step (B), the pH is from 7.2 to 9.8 and the total concentration of materials selected from the group consisting of molybdic acid, tungstic acid, polyphosphoric acid, polysilicic acid and the salts of all these acids is from 0.1 to 20 g/L.

5. A process according to claim 4, wherein the aqueous treatment solution with an adjusted pH of from 7.2 to 9.8 used in step (B) contains ammonium hydroxide, ammonium bicarbonate, or both.

6. A process according to claim 2, wherein, in the aqueous treatment solution used in step (B), the pH is from 7.2 to 9.8 and the total concentration of materials selected from the group consisting of molybdic acid, tungstic acid, polyphosphoric acid, polysilicic acid and the salts of all these acids is from 0.1 to 20 g/L.

7. A process according to claim 6, wherein the aqueous treatment solution with an adjusted pH of from 7.2 to 9.8 used in step (B) contains ammonium hydroxide, ammonium bicarbonate, or both.

8. A process according to claim 1, wherein, in the aqueous treatment solution used in step (B), the pH is from 7.:2 to 9.8 and the total concentration of materials selected from the group consisting of molybdic acid, tungstic acid, polyphosphoric acid, polysilicic acid and the salts of all these acids is from 0.1 to 20 g/L.

9. A process according to claim 8, wherein the aqueous treatment solution with an adjusted pH of from 7.2 to 9.8 used in step (B) contains ammonium hydroxide, ammonium bicarbonate, or both.

* * * * *